US008365180B2

(12) United States Patent
Kawasaki et al.

(10) Patent No.: US 8,365,180 B2
(45) Date of Patent: Jan. 29, 2013

(54) INFORMATION TERMINAL, COMPUTER RESOURCE MANAGING METHOD, AND VIRTUAL MACHINE EXECUTION SWITCHING METHOD

(75) Inventors: Shinichiro Kawasaki, Kawasaki (JP); Kiyoshi Ikehara, Kawasaki (JP); Masaki Nakano, Kawasaki (JP)

(73) Assignee: Xanavi Informatics Corporation, Kanagawa (JP)

( * ) Notice: Subject to any disclaimer, the term of this patent is extended or adjusted under 35 U.S.C. 154(b) by 609 days.

(21) Appl. No.: 10/593,572

(22) PCT Filed: Jun. 28, 2006

(86) PCT No.: PCT/JP2006/312868
§ 371 (c)(1),
(2), (4) Date: Aug. 20, 2008

(87) PCT Pub. No.: WO2007/001014
PCT Pub. Date: Jan. 4, 2007

(65) Prior Publication Data
US 2008/0301673 A1   Dec. 4, 2008

(30) Foreign Application Priority Data

Jun. 28, 2005   (JP) ................................ 2005-188474

(51) Int. Cl.
*G06F 9/46* (2006.01)
*G06F 9/50* (2006.01)
*G06F 9/455* (2006.01)
(52) U.S. Cl. ............. 718/104; 718/1; 718/100; 718/102
(58) Field of Classification Search ........................ None
See application file for complete search history.

(56) References Cited

U.S. PATENT DOCUMENTS
(Continued)

FOREIGN PATENT DOCUMENTS

| JP | 05-066954 | 3/1993 |
|---|---|---|
| JP | 07-200315 | 8/1995 |

(Continued)

OTHER PUBLICATIONS

Java 1.4 Virtual Machine Options, Apple Computer, Inc. Apr. 29, 2005.

(Continued)

*Primary Examiner* — Qing Wu
(74) *Attorney, Agent, or Firm* — Antonelli, Terry, Stout & Kraus, LLP.

(57) ABSTRACT

An in-vehicle terminal (101) is provided, which has a function ensuring that computer resource secured by a virtual machine (1a1) or a virtual machine (1b1) is controlled within a limit value of the computer resource that is allocated to the corresponding virtual machine, or a function which is capable of executing multiple virtual machines appropriately.
When the virtual machine (1a1) or the virtual machine (1b1) requests securing the computer resource, the in-vehicle terminal (101) requests the OS (143) to secure computer resource in response to the request, if the requested resource is lower than the limit value of the computer resource that is allocated to the corresponding virtual machine. Furthermore, the in-vehicle terminal (101) checks at predetermined intervals the continuously selected count of the virtual machine previously selected, and if the continuously selected count is equal to the limit value, or the virtual machine is in standby state, a different virtual machine is selected and the OS (143) is instructed to execute the selected virtual machine.

4 Claims, 13 Drawing Sheets

156

| APPLIED VIRTUAL MACHINE ID | RESOURCE TYPE | VIOLATION COUNT | SUSPEND VIRTUAL MACHINE | TERMINATE VIRTUAL MACHINE | DELETE INTERMEDIATE CODE STRING | NOTIFICATION TO SUPPLIER | CHANGE OF CPU OCCUPATION RATE |
|---|---|---|---|---|---|---|---|
| aaa | NUMBER OF CREATABLE TASKS | 3 | O | O | - | O | - |
| | NUMBER OF CREATABLE FILES | 3 | O | O | - | O | - |
| | MAXIMUM CREATABLE FILE SIZE | 1 | - | - | - | - | -10% |
| | | 10 | O | - | O | O | - |
| | SECURABLE DYNAMIC MEMORY SIZE | 5 | O | O | O | O | - |
| | ⋮ | ⋮ | ⋮ | ⋮ | ⋮ | ⋮ | ⋮ |
| bbb | NUMBER OF CREATABLE TASKS | 3 | O | O | - | O | - |
| | NUMBER OF CREATABLE FILES | 3 | O | O | O | O | - |
| | MAXIMUM CREATABLE FILE SIZE | 1 | - | - | - | O | -10% |
| | | 10 | O | O | O | O | - |
| | SECURABLE DYNAMIC MEMORY SIZE | 5 | O | O | O | O | - |
| | ⋮ | ⋮ | ⋮ | ⋮ | ⋮ | ⋮ | ⋮ |

1560  1561  1562  1563

U.S. PATENT DOCUMENTS

| | | | |
|---|---|---|---|
| 5,835,765 A | | 11/1998 | Matsumoto |
| 6,510,448 B1* | | 1/2003 | Churchyard ................. 718/108 |
| 6,829,772 B2* | | 12/2004 | Foote et al. .................. 719/330 |
| 2005/0125537 A1* | | 6/2005 | Martins et al. ............... 709/226 |
| 2005/0177635 A1* | | 8/2005 | Schmidt et al. .............. 709/226 |
| 2006/0031507 A1* | | 2/2006 | Wang ............................ 709/226 |
| 2009/0141299 A1 | | 6/2009 | Osada |

FOREIGN PATENT DOCUMENTS

| | | |
|---|---|---|
| JP | 07-311688 | 11/1995 |
| JP | 08-328880 | 12/1996 |
| JP | 2000-267869 | 9/2000 |
| JP | 2003-330732 | 11/2003 |
| JP | 2006-107197 | 4/2006 |

OTHER PUBLICATIONS

Waldspurger, C.A. Memory Resource Management in VMware ESX server, Proc. Fifth Symposium on Operating System Design and Implementation (OSDI'02), Dec. 2002.

Berger, E.D. et al.: Reconsidering custom memory allocation, In: Proceedings of the 17$^{th}$ ACM SIGPLAN conference on Object-oriented programming, systems, languages and applications, 2002, pp. 1-12.

Kazuyuki Shudo, "Virtualization Capability of Java Virtual Machine: Multitasking", Software Design No. 167, Sep. 18, 2004, with English translation.

* cited by examiner

| INTERMEDIATE CODE PROGRAM NAME (1400) | INTERMEDIATE CODE STRING NAME (1401) | VIRTUAL MACHINE ID CONDUCTED A TEST (1402) |
|---|---|---|
| AIR-CONDITIONING CONTROL APPLICATION | OBTAIN VEHICLE BODY TEMPERATURE | aaa |
| NAVIGATION APPLICATION | MAKE A SEARCH OF NEARBY SHOPS | aaa |
| : | : | : |
| NEWS DELIVERY APPLICATION | OBTAIN THE LATEST INFORMATION | bbb |

| APPLIED VIRTUAL MACHINE ID (1540) | RESOURCE TYPE (1541) | LIMIT VALUE (1542) |
|---|---|---|
| aaa | NUMBER OF CREATABLE TASKS | 32 UNITS |
| | NUMBER OF CREATABLE FILES | 128 UNITS |
| | MAXIMUM CREATABLE FILE SIZE | 2048kbyte |
| | NUMBER OF CREATABLE SEMAPHORES | 16 UNITS |
| | SECURABLE DYNAMIC MEMORY SIZE | 256kbyte |
| | CPU OCCUPATION RATE | 70% |
| | : | : |
| bbb | NUMBER OF CREATABLE TASKS | 16 UNITS |
| | NUMBER OF CREATABLE FILES | 64 UNITS |
| | MAXIMUM CREATABLE FILE SIZE | 512kbyte |
| | NUMBER OF CREATABLE SEMAPHORES | 8 UNITS |
| | SECURABLE DYNAMIC MEMORY SIZE | 64kbyte |
| | CPU OCCUPATION RATE | 30% |
| | : | : |

| VIOLATION DATE AND TIME (1550) | VIRTUAL MACHINE ID (1551) | INTERMEDIATE CODE PROGRAM NAME (1552) | LIMIT VALUE BEING VIOLATED (1553) | VOLUME BEING VIOLATED (1554) |
|---|---|---|---|---|
| 2000/1/4 23:25 | bbb | APPLICATION FOR REPRODUCING MUSIC | LIMIT VALUE OF MEMORY DYNAMICALLY RESERVED | 32byte |
| 2000/3/4 12:09 | bbb | APPLICATION FOR REPRODUCING MUSIC | LIMIT VALUE OF TOTAL SIZE OF CREATION AVAILABLE OBJECT | 16byte |
| 2000/4/4 18:11 | aaa | APPLICATION FOR CONTROLLING AIR-CONDITIONING | LIMIT VALUE OF MEMORY DYNAMICALLY RESERVED | 24byte |
| 2000/4/13 09:56 | bbb | APPLICATION FOR REPRODUCING MUSIC | LIMIT VALUE OF MEMORY DYNAMICALLY RESERVED | 512byte |
| 2000/4/16 11:04 | bbb | APPLICATION FOR NEWS DELIVERY | LIMIT VALUE OF MEMORY DYNAMICALLY RESERVED | ONE UNIT |
| : | : | : | : | : |

| APPLIED VIRTUAL MACHINE ID (1560) | RESOURCE TYPE (1561) | VIOLATION COUNT (1562) | SUSPEND VIRTUAL MACHINE | TERMINATE VIRTUAL MACHINE | DELETE INTERMEDIATE CODE STRING | NOTIFICATION TO SUPPLIER | CHANGE OF CPU OCCUPATION RATE |
|---|---|---|---|---|---|---|---|
| aaa | NUMBER OF CREATABLE TASKS | 3 | ○ | ○ | - | ○ | - |
| | NUMBER OF CREATABLE FILES | 3 | ○ | ○ | - | ○ | - |
| | MAXIMUM CREATABLE FILE SIZE | 1 | - | - | - | - | -10% |
| | | 10 | ○ | - | ○ | ○ | - |
| | SECURABLE DYNAMIC MEMORY SIZE | 5 | ○ | ○ | ○ | ○ | - |
| | : | : | : | : | : | : | : |
| bbb | NUMBER OF CREATABLE TASKS | 3 | ○ | ○ | - | ○ | - |
| | NUMBER OF CREATABLE FILES | 3 | ○ | ○ | ○ | ○ | - |
| | MAXIMUM CREATABLE FILE SIZE | 1 | - | - | - | ○ | -10% |
| | | 10 | ○ | ○ | ○ | ○ | - |
| | SECURABLE DYNAMIC MEMORY SIZE | 5 | ○ | ○ | ○ | ○ | - |
| | : | : | : | : | : | : | : |

(1563 spans: SUSPEND VIRTUAL MACHINE, TERMINATE VIRTUAL MACHINE, DELETE INTERMEDIATE CODE STRING, NOTIFICATION TO SUPPLIER, CHANGE OF CPU OCCUPATION RATE)

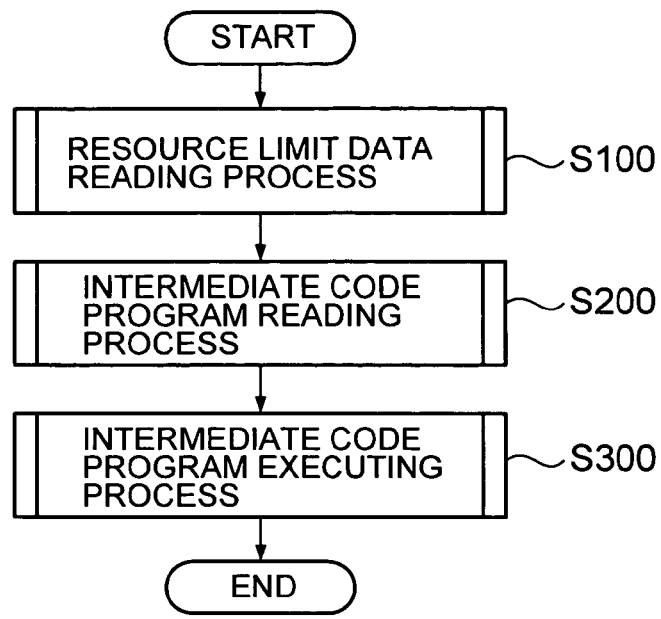
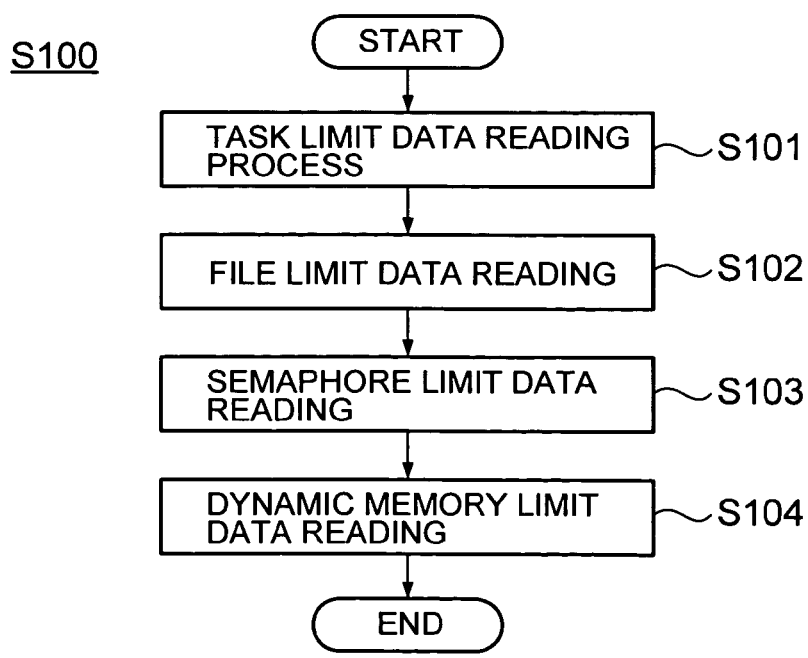

INFORMATION TERMINAL, COMPUTER RESOURCE MANAGING METHOD, AND VIRTUAL MACHINE EXECUTION SWITCHING METHOD

TECHNICAL FIELD

The present invention relates to an information terminal which executes an intermediate code program on a virtual machine.

BACKGROUND ART

Today, a large number of built-in information terminals are put to wide use. By way of example, there is an information terminal which is mounted on a vehicle such as an automobile. With this information terminal, a so-called car navigation device is provided, which supports movement to a destination by the use of map displaying and/or voice guiding.

Recently, in-vehicle information terminals continue to become multifunctional, and there are also terminals having functions such as video viewing and listening to music, displaying vehicle status, and controlling the vehicle, in addition to the navigation function. In order to immediately support such growing and expanding functionality, application of intermediate code techniques to the in-vehicle information terminal is now being developed. The intermediate code thus developed enables execution of a single program in multiple types of information terminals each having a different OS and operation unit. Therefore, manufacturing of the in-vehicle information terminal and creating of intermediate code program designed for the in-vehicle information terminal can be separately performed by different manufacturers, thereby enhancing productivity.

However, since in applying the intermediate code technique, an intermediate program is obtained externally, there is a problem in that it is not possible to know in advance the amount of computer resources that will be required. Therefore, management of the computer resources may become difficult. If an intermediate code program including an intermediate code created by a person with bad intent or an intermediate program containing a bug is executed, it may continue to consume files and memory without limitation, with the result that it may interfere with securing of resources by other programs, or deteriorate quick response properties of the overall system.

As a technique to avoid the situation above, Patent Document 1 discloses art in which a monitoring process (task) is provided to check periodically resource usage of each process, notification is made to a monitoring device, and the process is suspended, stopped, or resumed in accordance with the usage amount.

In order to support further growth and expansion in functionality of the in-vehicle information terminal, there is a growing need for multiple virtual machines carrying out the intermediate code programs to be simultaneously executed. By way of example, there is a case in which an intermediate program for controlling air conditioner and an intermediate program for reproducing music are executed simultaneously. However, simultaneous execution of multiple virtual machines may cause a problem such as an increase of resources in use and a conflict for computer resources. The resources in use may include not only memory and output device, but also CPU appropriation time and the like.

When multiple virtual machines are executed, in many cases, the multiple virtual machines to be executed are normally switched at short intervals, as if multiple processes are being executed simultaneously. Such processing as described above can be implemented, for example, by dividing each of the multiple processes into predetermined intervals, and multiple processes are switched from one to another every predetermined interval thus obtained.

[Patent Document 1]
Japanese Patent Laid-Open Publication No. 7-311688

DISCLOSURE OF THE INVENTION

Problems to be Solved by the Invention

The technique disclosed in Patent Document 1 is provided with a resource-using process which uses computer resources, and a monitoring process which monitors resource amount used by the resource-using process, separately, and after the resource-using process secures the computer resources, the monitoring process is notified of this securing. Therefore, depending on volume of the computer resources secured by the resource-using process, there is a possibility that the entire system may go down at the time when securing the computer resources is performed.

Some types of operation system (OS) used in built-in equipment may not have a mechanism in which multiple processes, each partitioned at predetermined intervals, are switched every predetermined interval. For example, there exists a type of OS having a mechanism that while executing a first process having a priority, other processes having lower priority are not allowed to be executed until the first process is completed. In such a case, if the OS is requested to execute two processes having the same priority, there is a possibility that only one of them is invariably executed.

The present invention has been made in view of the problems above, and an object of the present invention is to control computer resources, that are secured by a virtual machine, to within a limit value of the computer resources which are allocated to the virtual machine. Another object of the present invention is to execute multiple virtual machines appropriately.

Means to Solve the Problem

In order to solve the above problems, when there is a request from a virtual machine to secure a computer resource, an information terminal according to a first aspect of the present invention requests an OS to secure the computer resource in response to the request, if the requested volume is lower than a limit value of the computer resource that is allocated to the virtual machine.

Furthermore, the first aspect of the present invention provides an information terminal incorporating, for example, a virtual machine which executes on an OS an intermediate code program that is a program represented by an intermediate code; a resource limit value storing means which stores a limit value of a computer resource that is usable by the virtual machine; and a resource managing means in which when a request for securing a resource is received from the virtual machine, the limit value stored in the resource limit value storing means is referred to, and if the computer resource that becomes available for the virtual machine by securing the computer resource in response to the request is lower than the limit value, the OS is requested to secure the computer resource in response to the request, and if the computer resource that becomes available for the virtual machine by securing the computer resource in response to the request is equal to or higher than the limit value, the OS is not requested to secure the computer resource in response to the request.

An information terminal according to a second aspect of the present invention checks, at predetermined intervals, a continuously selected count of the virtual machine previously selected, and when the continuously selected count is equal to the limit value, or the virtual machine is in standby state, the information terminal selects a different virtual machine, and instructs the OS to execute the virtual machine thus selected.

The second aspect of the present invention provides an information terminal, for example, incorporating, multiple virtual machines each executing on an OS an intermediate code program being a program represented by an intermediate code; a resource limit value storing means in which continuously selectable counts, being the maximum number of continuously selectable counts with respect to each of the multiple virtual machines, are stored so as to be respectively associated with the multiple virtual machines; and a virtual machine switching means which switches and executes each of the multiple virtual machines, based on the continuously selectable counts that are stored in the resource limit value storing means; wherein, the virtual machine switching means determines at predetermined intervals whether or not the virtual machine currently selected is in a standby state, and if the currently selected virtual machine is in the standby state, selects a virtual machine that is different from the currently selected virtual machine, instructs the OS to execute the selected virtual machine, and also sets a continuously selected count of the selected virtual machine to one; if the currently selected virtual machine is in execution, refers to the continuously selectable count stored in the resource limit value storing means, and if the continuously selected count of the virtual machine currently selected is equal to the continuously selectable count associated with the currently selected virtual machine, selects a virtual machine different from the currently selected virtual machine, instructs the OS to execute the selected virtual machine, and also sets the continuously selected count of the selected virtual machine to one; and if the currently selected virtual machine is active, the continuously selectable count stored in the resource limit value storing means is referred to, and if the continuously selected count of the virtual machine currently selected is lower than the continuously selectable count associated with the currently selected virtual machine, selects again the currently selected virtual machine, instructs the OS to execute the reselected virtual machine, and increments the continuously selected count of the reselected virtual machine by one.

Effect of the Invention

With the information terminal according to the present invention, it is ensured that the computer resource secured by the virtual machine is controlled to be within a limit value of the computer resource that is allocated to the virtual machine. With the in-vehicle information terminal according to the present invention, it is possible to appropriately execute multiple virtual machines.

BRIEF DESCRIPTION OF DRAWINGS

FIG. 4 shows an example of a detailed configuration of ae safety tested intermediate code list 140;

FIG. 5 shows an example of a detailed configuration of resource limit data 154;

FIG. 6 shows an example of a detailed configuration of resource violation history 155;

FIG. 7 shows an example of a detailed configuration of process setting when violation occurs 156;

FIG. 8 is a flowchart showing an example of operations of the in-vehicle terminal 101;

FIG. 9 is a flowchart showing an example of a resource limit data reading process;

PREFERRED EMBODIMENTS OF THE INVENTION

Hereinafter, preferred embodiments of the present invention will be explained.

Figure 1:
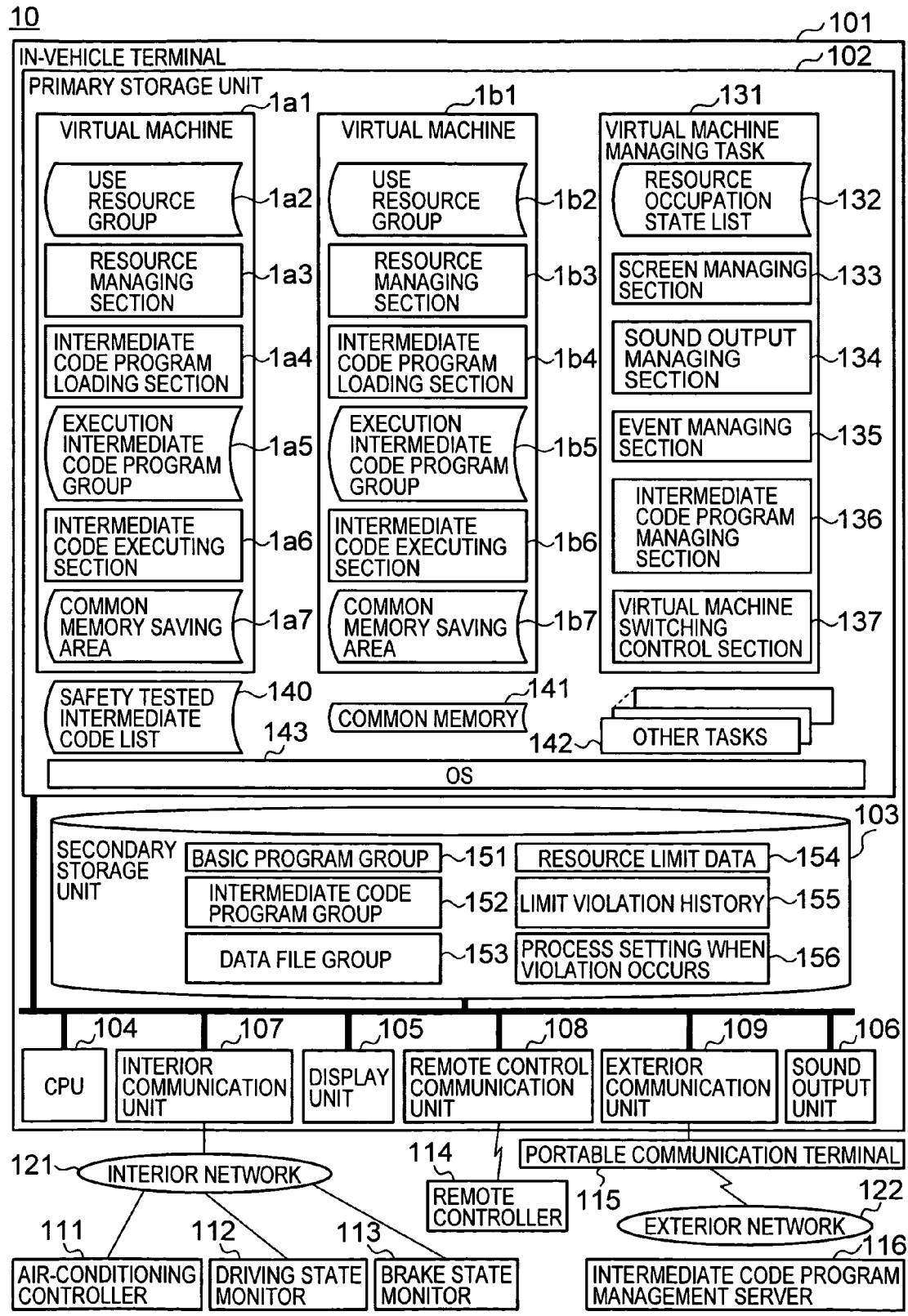
FIG. 1 shows a configuration of an in-vehicle communication system 10 relating to one embodiment of the present invention.

FIG. 1 shows a configuration of an in-vehicle communication system 10 relating to one embodiment of the present invention. The in-vehicle communication system 10 is mounted on a moving object such as a vehicle, and is provided with an in-vehicle terminal 101. The in-vehicle terminal 101 is connected to an air-conditioning controller 111, a driving state monitor 112, a brake state monitor 113, and the like, via an interior network 121. The in-vehicle terminal 101 obtains a state of the vehicle from the equipment above, and controls the air-conditioning equipment and the like. The in-vehicle terminal 101 performs wired communication or wireless communication with a remote controller 114 that is manipulated by a person on board. The person on board operates the in-vehicle terminal 101 via the remote controller 114.

The in-vehicle terminal 101 performs communication with an intermediate code program management server 116, via a portable communication terminal 115 and exterior network 122 such as the Internet and wireless telephone communication network. In the present embodiment, the portable communication terminal 115 may be wireless communication equipment such as a mobile phone and PDA, and is installed outside the in-vehicle terminal 101. As an alternative example, the in-vehicle terminal 101 may incorporate such functions of the portable communication terminal 115.

The intermediate code program management server 116 supplies the in-vehicle terminal 101 with a program and the like to be operated on the in-vehicle terminal 101, via the exterior network 122 and the portable communication terminal 115. Furthermore, the intermediate code program management server 116 obtains from the in-vehicle terminal 101 a defect in the program supplied to the in-vehicle terminal 101, and gives notice about the latest version of the intermediate code program that has already been installed in the in-vehicle terminal 101.

Next, the in-vehicle terminal 101 will be explained in detail. The in-vehicle terminal 101 includes a primary storage unit 102, a secondary storage unit 103, a CPU 104, a display unit 105, a sound output unit 106, an interior communication unit 107, a remote control communication unit 108, and an exterior communication unit 109.

The secondary storage unit 103 has a function to hold recorded data even when power supplying is shut down, and stores a program and data to be used by the program, setting information of the program, and the like. The secondary storage unit 103 includes a basic program group 151, an intermediate code program group 152, a data file group 153, resource limit data 154, resource violation history 155, and process setting when violation occurs 156. The CPU 104 loads the program and the like stored in the secondary storage unit 103 into the primary storage unit 102, at a predetermined timing such as turning the power ON in the in-vehicle terminal 101, and executes the loaded program.

The display unit 105 and the sound output unit 106 provide a person on board with information, using pictures and sounds respectively. The remote control communication unit 108 obtains manipulation information from the person on board via the remote controller 114. A user of the in-vehicle terminal 101 inputs information into the in-vehicle terminal 101 via the remote controller 114, and receives information from the in-vehicle terminal 101 via the display unit 105 and the sound output unit 106. An information input/output device is not limited to those shown here, and another device may be employed. For example, information may be inputted by using a button and a touch panel installed in the in-vehicle terminal 101. The interior communication unit 107 is in charge of performing communication with the air-conditioning controller 111 and the like, via the interior network 121. The exterior communication unit 109 is in charge of performing communication with the intermediate code program management server 116 and the like, via the portable communication terminal 115 and a driving state monitor 112.

Multiple tasks and an operating system 143 (hereinafter referred to as "OS 143") are loaded into the primary storage unit 102. Those multiple tasks are executed in parallel under the management by the OS 143. Those tasks and the OS 143 are included in the basic program group 151 that is stored in the secondary storage unit 103.

Each of the multiple virtual machines (virtual machine 1a1, 1b1) executed in the primary storage unit 102 has at least one virtual machine task. Each of the virtual machine tasks is different from the task managed by the OS 143. Each of the virtual machine tasks is allocated to any one of the tasks managed by the OS 143, and the virtual machine task is executed by the OS 143 via the task thus allocated.

In the present example, each of the virtual machine tasks is allocated to any one of the tasks managed by the OS 143. However, as an alternative example, a configuration is possible such that one of the tasks managed by the OS 143 is allocated to one virtual machine, and the virtual machine task that is executed via the allocated task is switched within the virtual machine, thereby executing each virtual machine task.

On the primary storage unit 102, a virtual machine managing task 131, other tasks 142, and the like, are loaded, and the OS 143 manages and executes those tasks. Furthermore, the OS 143 uses an internal scheduler function to execute each task in parallel, and mediates the exchanges between other devices outside the in-vehicle terminal 101 and each task in the terminal.

A safety tested intermediate code list 140 stores information relating to the intermediate code program that has been subjected to safety testing according to the following process. The safety tested intermediate code list 140 is referred to by multiple virtual machines (virtual machine 1a1, virtual machine 1b1).

The intermediate code program group 152 stores code strings of the intermediate code program, setting information of the program, and the like. The intermediate code program stored in the intermediate code program group 152 may be stored in advance at the time of manufacturing the in-vehicle terminal 101, or it may be stored therein after being obtained from the intermediate program management server 116 via the exterior network 122 and the portable communication terminal 115.

Each of the virtual machine 1a1 and the virtual machine 1b1 reads the intermediate code strings and the like from the intermediate code program group 152, by using JIT (Just-In-Time) compiler and the like, for example, to convert the intermediate code strings thus read into a format appropriate for execution, and then executes the converted code strings. The data file group 153 stores data and the like necessary for executing those tasks and intermediate code program. The resource limit data 154 is data that is read by the virtual machine 1a1 and the virtual machine 1b1 at the time of starting up, and each virtual machine stores the limit information of the resources that are utilized while each virtual machine is executing the intermediate code program.

The resource violation history 155 stores as a history, information relating to violation, when the virtual machine 1a1 and the virtual machine 1b1 violate the resource limits respectively associated therewith. Process setting when violation occurs 156 stores information regarding a process which handles a case where each of the virtual machine 1a1 and the virtual machine 1b1 violates the resource limit, while each machine is executing the intermediate code program.

In the present embodiment, an explanation is given, taking an example in which there are two virtual machines that operate within the in-vehicle terminal 101. However, the present invention is not limited to this example, and the number of machines may be any number, two or more.

The virtual machine 1a1 includes a use resource group 1a2, a resource managing section 1a3, an intermediate code program loading section 1a4, an execution intermediate code program group 1a5, and an intermediate code executing section 1a6. In this example, the virtual machine 1a1 and the virtual machine 1b1 are the same in configuration, and explanations will be omitted.

The use resource group 1a2 holds resources which are necessary for executing the intermediate code program. The execution intermediate code program group 1a5 holds a program code of the intermediate code program as an execution target. The intermediate code program loading section 1a4 reads into the virtual machine, necessary intermediate code program from the intermediate code program group 152 on the secondary storage unit 103, converts the read intermediate code program into a format appropriate for execution, and stores the converted program in the execution intermediate code program group 1a5.

The intermediate code executing section 1a6 executes a program stored in the execution intermediate code program group 1a5. When it becomes necessary to secure, release, or manipulate various computer resources, while executing the program, the intermediate code executing section 1a6 requests the resource managing section 1a3 to secure, release, or manipulate the corresponding computer resources.

The resource managing section 1a3 manages the use resource group 1a2, and for example, performs the following operations: initializes the use resource group 1a2 when starting up the virtual machine; if there is a request from the intermediate code executing section 1a6 to secure or manipulate the computer resources, the resource limit data 154 within the secondary storage unit 103 is referred to, and the OS 143 is requested to secure or manipulate resources in response to the request, when the request is within the resource limit value that is permitted in the virtual machine 1a1.

The virtual machine managing task 131 executes the following actions such as adjustments between each virtual machine and I/O device of the in-vehicle terminal 101, deleting the intermediate code programs executed by each of the virtual machines, and controlling of appropriation time of the CPU 104 by each of the virtual machines. The virtual machine managing task 131 includes a resource occupation state list 132, a screen managing section 133, a sound output managing section 134, an event managing section 135, an intermediate code program managing section 136, and a virtual machine switching control section 137.

The resource occupation state list 132 holds state information to identify a virtual machine which occupies the display unit 105, the sound output unit 106, or the remote control communication unit 108. The screen managing section 133 controls a right to occupy the display unit 105 by the virtual machine, and stores identification information of the virtual machine currently occupying the display unit 105 in the resource occupation state list 132. The sound output managing section 134 controls a right to occupy the sound output unit 106 by the virtual machine, and stores identification information of the virtual machine currently occupying the sound output unit 106 in the resource occupation state list 132. The event managing section 135 controls a right to occupy the remote control communication unit 108 by the virtual machine, and stores identification information of the virtual machine currently occupying the remote control communication unit 108 in the resource occupation state list 132.

The intermediate code program managing section 136 manages the intermediate code program group 152 within the secondary storage unit 103, and performs processing such as deleting an intermediate code program that frequently violates the limit of the computer resources, and updating the intermediate code program to the latest version. The virtual machine switching control section 137 instructs the OS 143 to suspend and resume a task that is allocated to each virtual machine, thereby managing the execution time of each virtual machine, and controlling the time period when each of the virtual machines appropriates the CPU 104.

Figure 2:
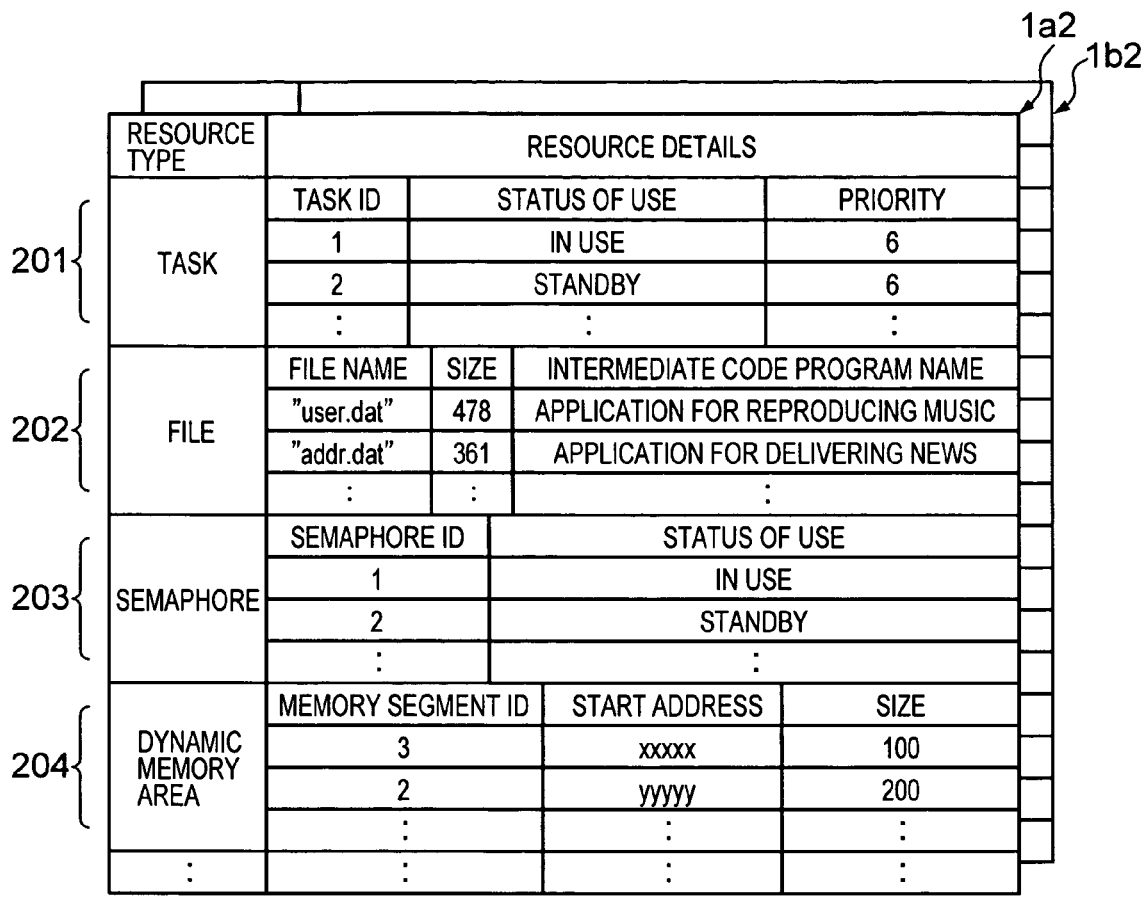
FIG. 2 shows an example of a detailed configuration of a use resource group 1$a$2 and use resource group 1$b$2.

FIG. 2 shows an example of detailed configuration of the use resource group 1a2 and the use resource group 1b2. The use resource group 1a2 stores information of each of the resources secured by the virtual machine 1a1, associating the information with resource types that identify the type of resources. Since the use resource group 1a2 and the use resource group 1b2 have the same configuration, explanation will be made regarding the use resource group 1a2 only, and explanation of the use resource group 1b2 will be omitted. The use resource group 1a2 stores task information 201, file information 202, semaphore information 203, and dynamic memory area information 204.

The task information 201 stores a state of the task that is allocated to each of the multiple virtual machine tasks in the virtual machine, managed by the OS 143, and a priority of the task, associating the priority with each task ID. The priority is that of the virtual machine task configured by a designer of the intermediate code program that is executed by the virtual machine 1a1, and this priority is used by the OS 143 to decide an execution time allocation and execution sequence of the tasks managed by the OS 143.

When the intermediate code executing section 1a6 determines, in response to execution of a program, that it is necessary to secure a task managed by the OS 143, the intermediate code executing section 1a6 requests the resource managing section 1a3 to secure this task. Then, the resource managing section 1a3 refers to the resource limit data 154, and when this request satisfies the limit value, the resource managing section 1a3 requests the OS 143 to secure the task in response to this request, and sets the state as "in use", and adds the task in the task information 201. Upon receipt of a termination notice of the task thus secured from the intermediate code executing section 1a6, the resource managing section 1a3 changes the state of the corresponding task to "standby" in the task information 201. On this occasion, the resource managing section 1a3 does not instruct the OS 143 to release the task whose state has been changed to "standby".

The file information 202 stores and associates with a file name an intermediate code program name and data size, being information of a file that is a unit for managing the data stored in the secondary storage unit 103.

When the intermediate code executing section 1a6 determines that it is necessary to create, write, or delete a file according program execution, the intermediate code executing section 1a6 requests the resource managing section 1a3 to create the file, or the like. Then, the resource managing section 1a3 refers to the resource limit data 154, and if the request satisfies the limit value, the resource managing section 1a3 requests the OS 143 to create the file or the like, in response to the request, and changes the file information 202.

Semaphore information 203 stores and associates with a semaphore ID a usage state of semaphore, which is a software resource to provide a function to perform synchronization when multiple tasks access the same computer resource. Each virtual machine requests the OS 143 at startup time, to secure semaphores corresponding to a restricted number of units, and stores the semaphores in the semaphore information 203 after changing the state of all the semaphores to "standby".

Upon receipt of a request to use the semaphore from the intermediate code executing section 1a6, the resource managing section 1a3 refers to the semaphore information 203, changes one of the semaphores in "standby" to "in use" state, and notifies the intermediate code executing section 1a6 of permission to use the semaphore. Upon receipt of a request for releasing the semaphore from the intermediate code executing section 1a6, the resource managing section 1a3 does not request the OS 143 to release the semaphore, but changes the state of the semaphore to "standby". As thus described, the virtual machine 1a1 does not execute new securing or releasing of a semaphore while a program is being executed, but executes the program by reusing the semaphore that is secured in advance.

The dynamic memory area information 204 stores and associates with a memory segment ID information regarding memory that is dynamically secured according to the execution of a program by the intermediate code executing section 1a6. Each of the virtual machines requests the OS 143 at the startup time to secure a memory corresponding to a restricted size, and in response to a memory securing request from the intermediate code executing section 1a6, the memory is dynamically secured and released within the range of the memory that has been secured at the startup time.

If the intermediate code executing section 1a6 determines that it is necessary to secure or release the memory according to execution of the program, the intermediate code executing section 1a6 requests the resource managing section 1a3 to secure the memory or the like. Then, the resource managing section 1a3 refers to the resource limit data 154, and if the request satisfies the limit value, the resource managing section 1a3 executes securing the memory or the like in response to the request.

It is to be noted that the use resource group 1a2 and the use resource group 1b2 may store access rights to disk partition, sockets, or the like, in addition to the above computer resources.

Figure 3:
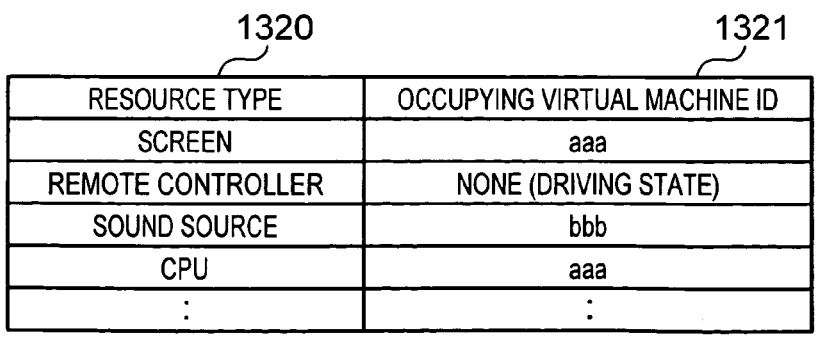
FIG. 3 shows an example of a detailed configuration of a resource occupation state list 132.

FIG. 3 shows one example of a detailed configuration of the resource occupation state list 132. The resource occupation state list 132 stores a virtual machine ID 1321 which is currently occupying the computer resource, so as to make an association with a resource type 1320 indicating a type of the computer resource. Computer resources such as a screen, a remote controller, a sound source, and a CPU can be used by one virtual machine only.

By referring to the resource occupation state list 132, it is possible to judge a virtual machine which is currently using the resources.

FIG. 4 shows an example of a detailed configuration of the safety tested intermediate code list 140. The safety tested intermediate code list 140 stores safety tested intermediate code string name 1401 for which safety testing has been completed by the intermediate code program loading section 1a4, and a test conducting virtual machine ID 1402 being an ID of the virtual machine which conducted the test, so as to associate these with the intermediate code program name 1400. By referring to the safety tested intermediate code list 140, it is possible for the virtual machine 1a1 and the virtual machine 1b1 to determine whether or not the safety test has already been completed regarding the intermediate code string as a target for loading. If the safety test has already been completed, the intermediate code program can be loaded without conducting the safety test by the intermediate code program loading section 1a4.

FIG. 5 shows an example of a detailed configuration of the resource limit data 154. The resource limit data 154 stores and associates with the resource types 1541, respectively, limit values 1542 of the computer resources with respect to each virtual machine ID 1540, to which the limit value is applied. The limit values 1542 respectively for the computer recourses, being set in the resource limit data 154, are configured in advance, for example, by a manufacturer or the like, at the time of shipment of the in-vehicle terminal 101.

In this example, "aaa" indicates a virtual machine ID of the virtual machine 1a1, and "bbb" indicates a virtual machine ID of the virtual machine 1b1. An example is shown of the resource limit data 154 in which the virtual machine 1a1 is configured on the assumption that it executes an intermediate code program being more significant than the virtual machine 1b1. Therefore, the limit values of the computer resources associated with the virtual machine 1a1 are set higher and those of the computer resources associated with the virtual machine 1b1 are set lower, so that the virtual machine 1a1 has priority in having the computer resources allocated.

It is to be noted that types of the computer resources are not limited to the example as shown in FIG. 5, but may include computer resources and the like designating a partition which each virtual machine is allowed to read from and write into. For instance, if the most significant data, such as basic program group 151, is stored in the first partition, significant data such as vehicle information and personal information is stored in the second partition, and other general data is stored in the third partition, only a specific virtual machine may be allowed to access to the first partition.

FIG. 6 shows an example of a detailed configuration of the resource violation history 155. The resource violation history 155 stores a virtual machine ID 1551, an intermediate code program name 1552 that has violated the limit value, a violated limit value 1553, and a violated volume 1554, so as to associate these with violation date and time 1550 when the limit was violated.

By referring to the resource violation history 155, the CPU 104 is allowed to notify the intermediate code program management server 116 of the limit violation occurrence contents, via the portable communication terminal 115 and the exterior network 122. Accordingly, a developer and the like of the intermediate code program are allowed to efficiently examine a cause of the resource limit violation and study precautionary steps against the violation.

FIG. 7 shows an example of a detailed configuration of the process setting when violation occurs 156. The process setting when violation occurs 156 defines processes that are to be performed respectively when violations of the limit values occur, the limit values being shown in FIG. 5. The process setting when violation occurs 156 stores the violation count 1562 of computer resources, and processing when violation occurs 1563 that is performed when a violation of the limit value is detected, with respect to each virtual machine ID 1560 to which the processing is applied, in such a manner as being associated with the resource types 1561. For example, the process setting when violation occurs 156 is configured in advance by a manufacturer and the like at the time of shipping of the in-vehicle terminal 101. It is to be noted that the number of items being set and the set value may be different by virtual machine.

In the example of FIG. 7, if a violation of the number of creation available tasks occurs three times in the virtual machine 1a1, the virtual machine 1a1 is suspended and terminated, and the intermediate code program management server 116 is notified of the occurrence of the violation. However, the intermediate code program that was operating at the time of violation occurrence is not deleted. When a violation of the limit of the maximum creatable file size occurs once, the virtual machine 1a1 is not suspended, but when the number of violation counts reaches ten times, the virtual machine 1a1 is suspended.

By using the process setting when violation occurs 156, processing contents can be set in detail, for the time of resource violation occurrence in each virtual machine. According to significance level of each virtual machine, significance level of application to be executed, volume of each resource, frequency of limit violation, scale of limit violation, and the like, a designated process may be changed, thereby enabling a further stable operation of the in-vehicle terminal 101.

In the present example, the processing contents are defined based on the number of violation counts. However, it is further possible to define the processing contents according to scale of violation, frequency of violation, and developing source and the like of the intermediate code program which have caused the violation.

Next, with reference to FIG. 8 to FIG. 18, operations of the in-vehicle terminal 101 will be explained.

FIG. 8 is a flowchart showing an example of operations of the in-vehicle terminal 101. The in-vehicle terminal 101 starts processing as shown in the present flowchart at a predetermined time such as applying power thereto. Initially, multiple tasks are started, including virtual machine 1a1, virtual machine 1b1, and virtual machine managing task 131. It is to be noted here that in the following descriptions, the virtual machine 1a1 and the virtual machine 1b1 perform the same processing. Therefore, explanations will be made only regarding the virtual machine 1a1, as to processing that is identical between the virtual machine 1a1 and the virtual machine 1b1.

The resource managing section 1a3 reads the resource limit data 154 to restrict the computer resources that are used while the intermediate code program is executed (S100). On this occasion, processing such as initialization is executed for resource management, if necessary.

Next, the intermediate code program loading section 1a4 reads an intermediate code program as an execution target, from the intermediate code program group 152 (S200). On this occasion, the intermediate code program loading section 1a4 converts the intermediate code program thus read, into an executable format, and stores it in an execution intermediate code program group 1a5. Then, the intermediate code executing section 1a6 executes a program stored in the execution intermediate code program group 1a5 (S300).

FIG. 9 is a flowchart showing an example of a resource limit data reading process (S100). The resource managing section 1a3 reads a limit value of the number of creatable tasks (S101), reads a limit value regarding a file (S102), reads a limit value regarding the number of creatable semaphores (S103) and reads a limit value of the maximum size of dynamic memory available for securing (S104).

It is to be noted here that in step 103, when a limit value regarding the number of creatable semaphores is read, the resource managing section 1a3 secures semaphores corresponding to the limit value by making a request to the OS 143, changes the state of all the semaphores corresponding to the limit value thus secured to "standby", and registers them in the use resource group 1a2. Similarly, in step 104, when a limit value of the maximum size of dynamic memory available for securing is read, the resource managing section 1a3 secures a memory corresponding to the limit value by making a request to the OS 143, changes the state of all the memory thus secured corresponding to the limit value to "unused", and registers the memory in the use resource group 1a2.

Figure 10:
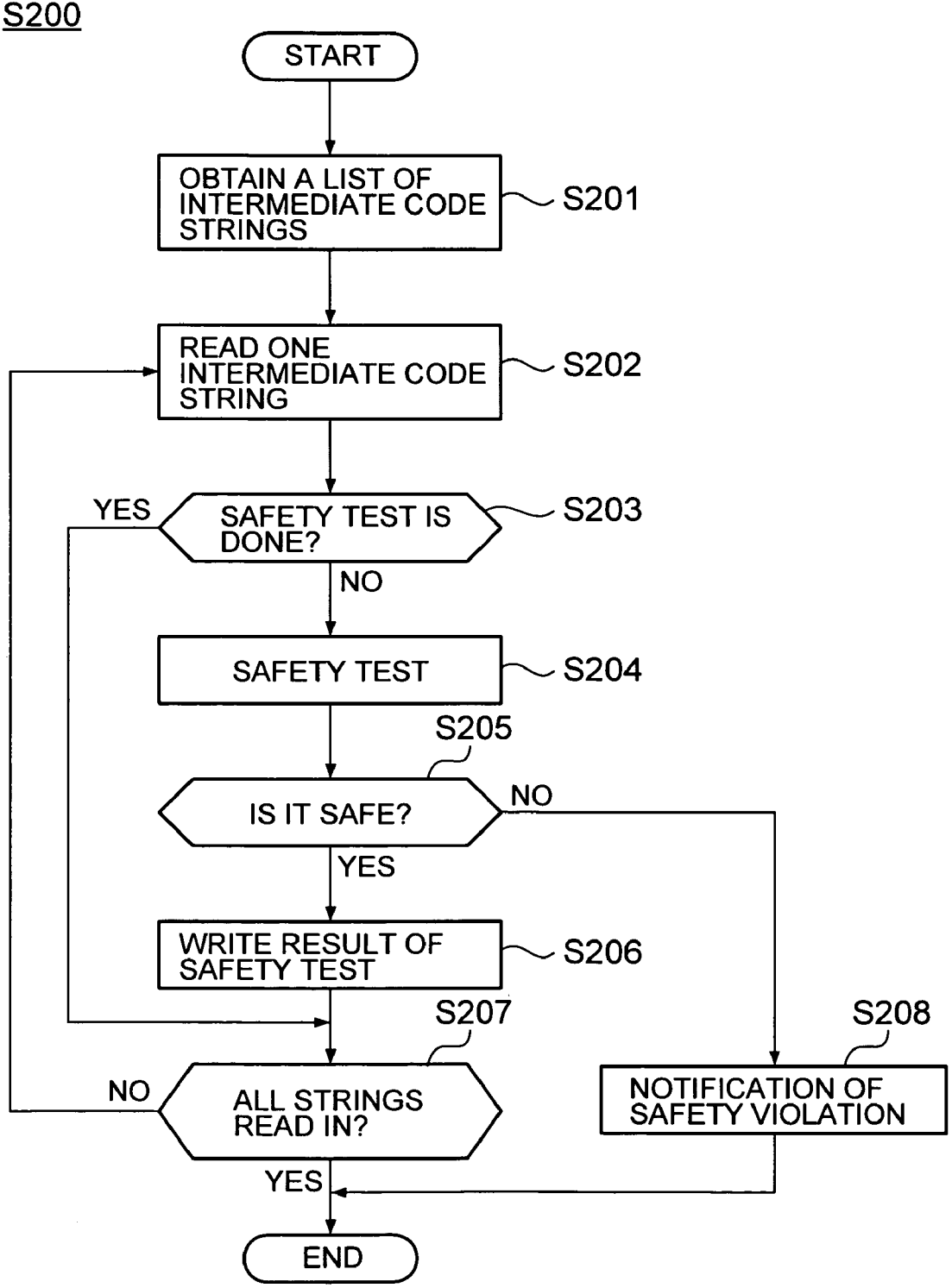
FIG. 10 is a flowchart showing an example of a intermediate code program reading process.

FIG. 10 is a flowchart showing an example of the intermediate code program reading process (S200). Firstly, the intermediate code program loading section 1a4 obtains a list, in which identification information of the intermediate code programs to be read is described, from the intermediate code program group 152 (S201). Then, the intermediate code program loading section 1a4 selects one of the intermediate code programs that are described in the obtained list (S202).

The intermediate code program loading section 1a4 refers to the safety tested intermediate code list 140, and determines whether or not the safety test of the selected intermediate code program has been finished (S203). If the safety test has already been finished (S203: Yes), the intermediate code program loading section 1a4 performs processing as shown in step 207.

As thus described, by omitting a safety testing process of the intermediate code program, as to which a different virtual machine has already conducted the safety test, it is possible to reduce processing load when the intermediate code program is loaded.

If the safety test has not been finished yet (S203: No), the intermediate code program loading section 1a4 conducts the safety test against the intermediate code program thus selected (S204). In step 204, the intermediate code program loading section 1a4 conducts testing such as whether or not any invalid command code is included in the intermediate code program, whether or not there is a consistency in command code strings, and whether or not there is a command code string which accesses an address not to be accessed.

After safety is confirmed (S205: Yes), the intermediate code program loading section 1a4 stores a result of testing, in the safety tested intermediate code list 140 (S206). Then, it is determined whether or not all the intermediate codes included in the list have been read in (S207). If all of the intermediate codes are not read in, the intermediate code program loading section 1a4 executes the processing indicated in step 203. If all the codes are read in, the processing as shown in the present flowchart is finished.

If safety has not been confirmed (S205: No), the intermediate code program loading section 1a4 gives notice to a user of the in-vehicle terminal 101, via 105 and the like, that there is a problem in safety, as well as notifying the intermediate code program management server 116 of the problem, via the portable communication terminal 115 and the exterior network 122 (S208). Then, the intermediate code program loading section 1a4 instructs the intermediate code executing section 1a6 to suspend starting or executing the intermediate code program, and then, the processing indicated in the present flowchart is finished.

Figure 11:
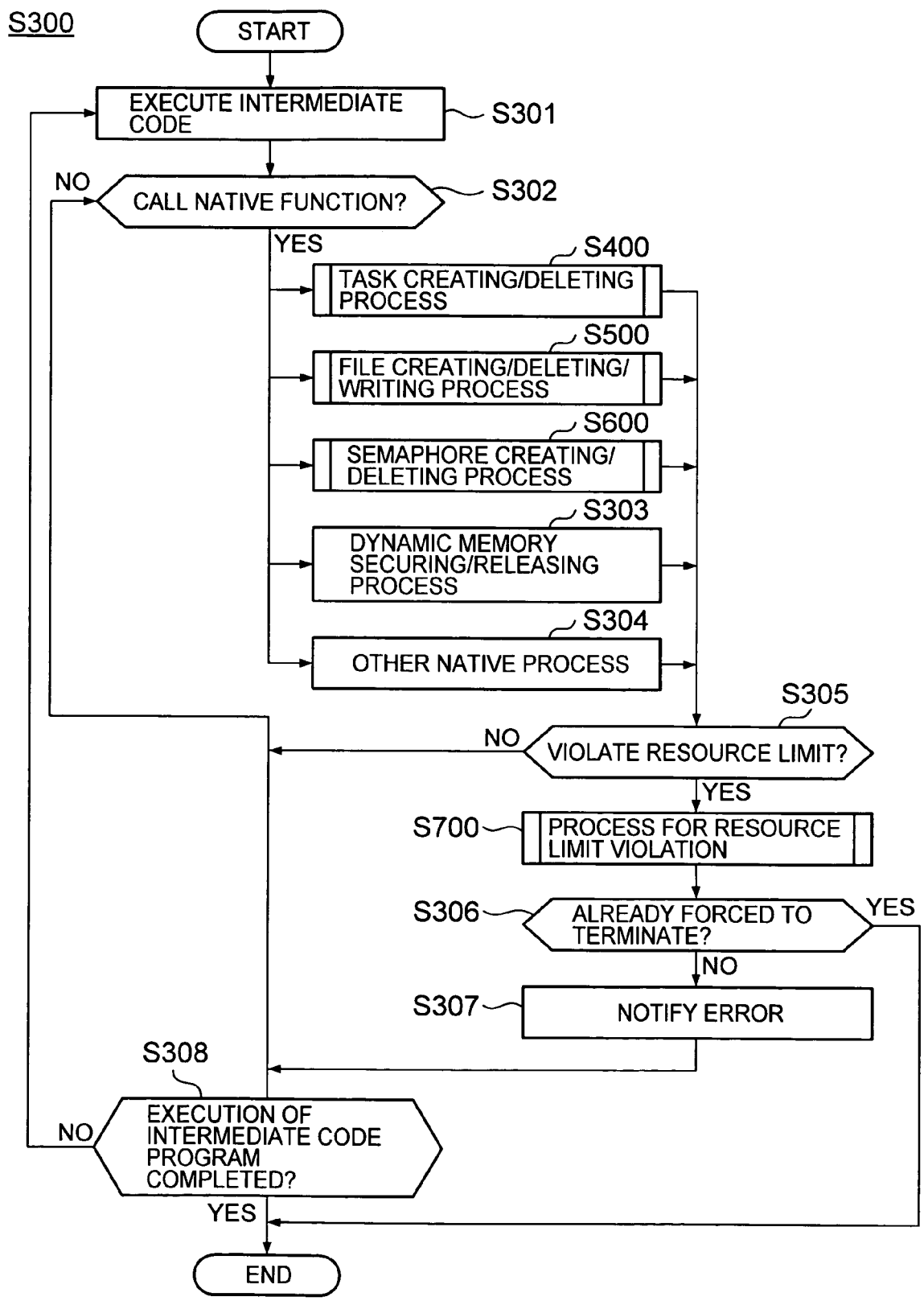
FIG. 11 is a flowchart showing an example of an intermediate code program executing process.

FIG. 11 is a flowchart showing an example of the intermediate code program executing process (S300). Firstly, the intermediate code executing section 1a6 interprets and executes a command of the intermediate code string one by one, thereby executing the intermediate code program (S301). Then, the intermediate code executing section 1a6 determines whether or not calling of native functions is necessary, such as securing, releasing, and manipulating various resources, those native functions being unable to be executed by the intermediate code program (S302).

If calling of the native functions is not necessary (S302: No), the intermediate code executing section 1a6 determines whether or not execution of the intermediate code program has been finished (S308). If execution of the intermediate code program has not been finished yet (S308: No), the intermediate code executing section 1a6 executes the next command of the intermediate code string in step 301. When execution of the intermediate code program has been completed (S308: Yes), the intermediate code executing section 1a6 finishes the processing as shown in the present flowchart.

If calling of the native functions is necessary (S302: Yes), the intermediate code executing section 1a6 instructs the resource managing section 1a3 to perform the corresponding native functions (S400, S500, S600, S303, S304). Details of processing in step 400 to step 600 will be described below. In step 303, the resource managing section 1a3 refers to the resource limit data 154 within the secondary storage unit 103, and dynamically secures or releases the memory, while restricting the total size of the memory that is dynamically secured within the limit value. In step 304, the resource managing section 1a3 performs processing of native functions other than described above, such as securing communication sockets.

If a limit value violation of the computer resource occurs while any of the above native processes is executed (S305: Yes), the resource managing section 1a3 executes the process against an error that has occurred (S700). Then, in the process against the error, if the virtual machine is not forced to terminate (S306: No), the resource managing section 1a3 notifies the intermediate code executing section 1a6 of the error information, allowing the intermediate code executing section 1a6 to perform error processing (S307) and then performing the process as shown in step 308.

Figure 12:
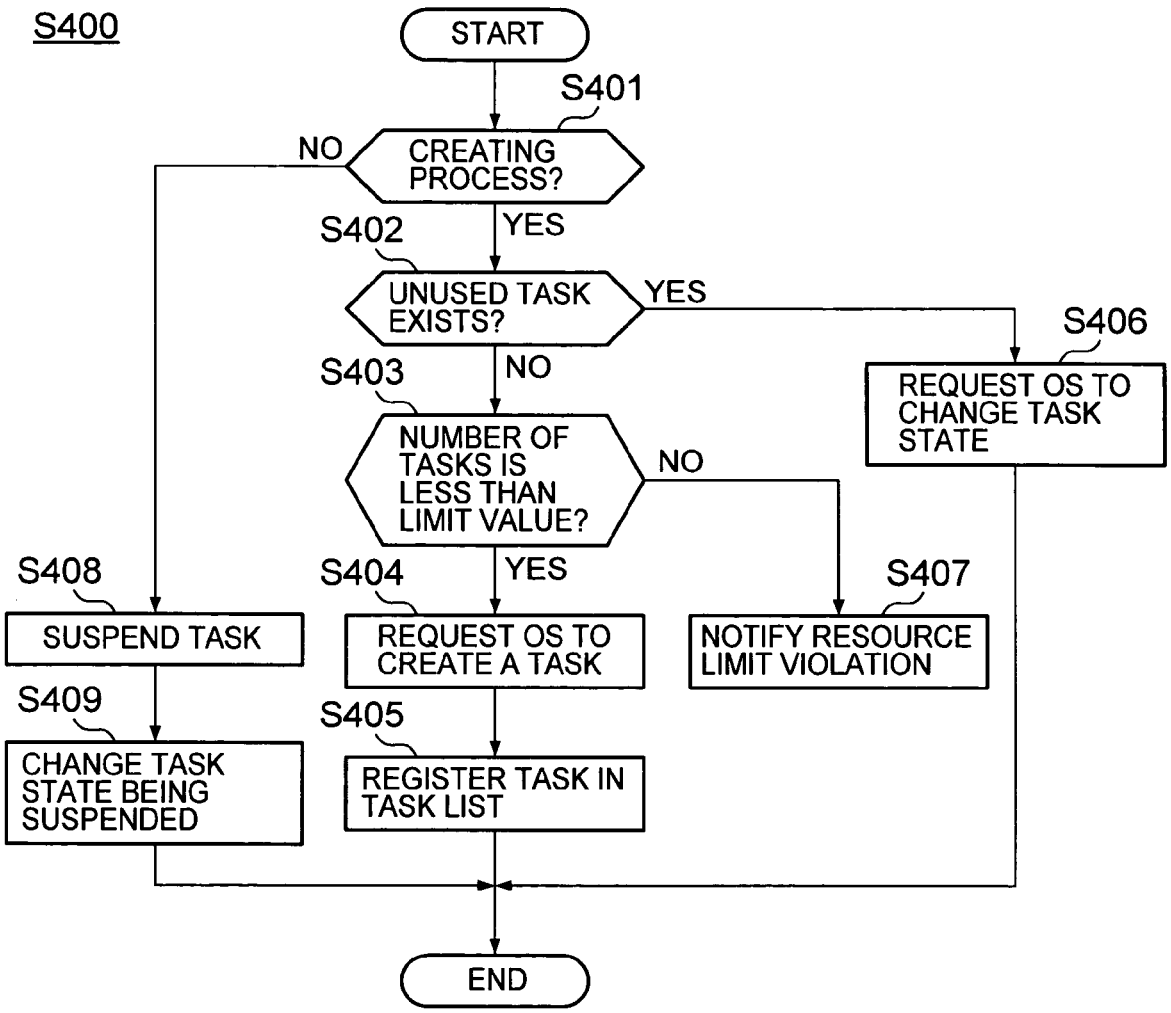
FIG. 12 is a flowchart showing an example of a task creating/deleting process.

FIG. 12 is a flowchart showing an example of a task creating/deleting process (S400). Firstly, the resource managing section 1a3 determines whether or not the processing is a task creating process (S401), and if it is a task creating process, the resource managing section 1a3 refers to the use resource group 1a2, and determines whether or not there is an unused task (S402). If there is an unused task (S402: Yes), the resource managing section 1a3 requests the OS 143 to change the state of the corresponding task to "active" (S406), and finishes the processing as indicated in the present flowchart.

If there is not any unused task (S402: No), the resource managing section 1a3 determines whether or not creating a task may render the total number of created tasks to be lower than the limit value of the number of creation available tasks (S403). If it is equal to or higher than the limit value (S403: No), the resource managing section 1a3 notifies the intermediate code executing section 1a6 of an error indicating that task creation is not allowed, and finishes the processing as shown in the present flowchart.

If it is lower than the limit value (S403: Yes), the resource managing section 1a3 requests the OS 143 to create a task (S404). Then, the resource managing section 1a3 changes the state of the task thus created to "in use", registers the task in the use resource group 1a2 (S405), and then finishes the processing as indicated in the present flowchart.

If the processing is a task deleting process (S401: No), the resource managing section 1a3 requests the OS 143 to change the state of the corresponding task to "standby", thereby suspending the task (S408). In step 408, the resource managing section 1a3 does not request the OS 143 to release the task being suspended, and keeps it secured. The resource managing section 1a3 changes the state of the task being suspended to "standby" within the use resource group 1a2 (S409), and finishes the processing as indicated in the present flowchart.

Figure 13:
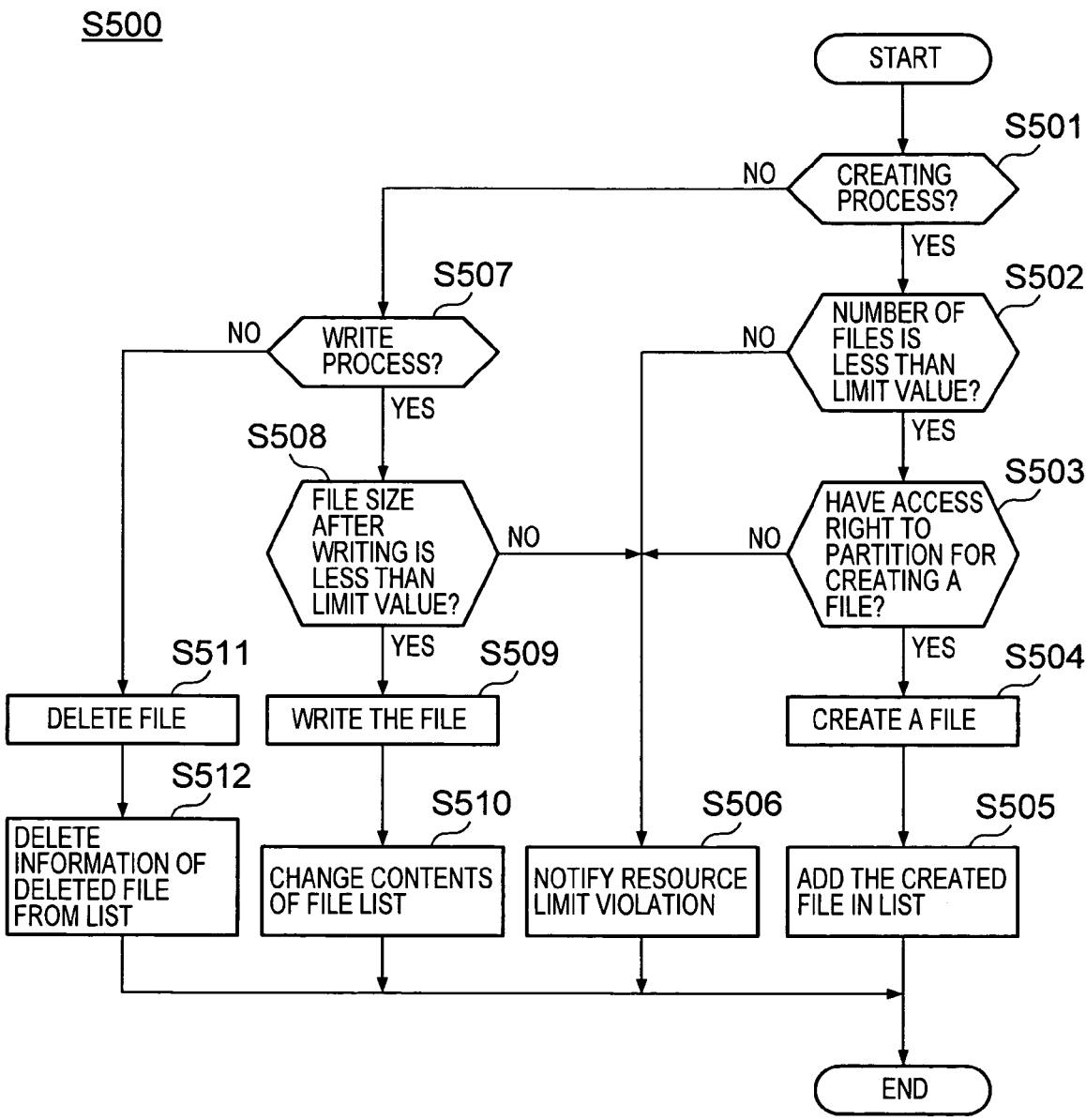
FIG. 13 is a flowchart showing an example of a file creating/deleting/writing process.

FIG. 13 is a flowchart which shows an example of a file creating/deleting/writing process (S500). Firstly, if a request from the intermediate code executing section 1a6 is a file creating process (S501: Yes), the resource managing section 1a3 refers to the resource limit data 154, and determines whether or not creating a file in response to the request from the intermediate code executing section 1a6 may render the number of created files lower than the limit value of the number of creation available files (S502). If the number of created files is equal to or higher than the limit value (S502: No), the resource managing section 1a3 notifies the intermediate code executing section 1a6 of an error (S506), and finishes the processing as indicated in the present flowchart.

If the number of created files is lower than the limit value (S502: Yes), the resource managing section 1a3 creates a file (S504) when the virtual machine 1a1 has an access right to a disk area on which the file is to be created (S503: Yes). Then, the resource managing section 1a3 registers information of the create file in the use resource group 1a2 (S505), and processing as indicated in the present flowchart is finished.

In cases where the request from the intermediate code executing section 1a6 is not a file creating process (S501: No), if the request from the intermediate code executing section 1a6 is a writing process into a file, the resource managing section 1a3 refers to the resource limit data 154, and determines whether or not the size of the file thus written in response to the request from the intermediate code executing section 1a6 is lower than the limit value of the creation available maximum file size (S508). If the size of the file is equal to or higher than the limit value (S508: No), the resource managing section 1a3 performs processing as indicated in step 506.

If the size of the file is lower than the limit value (S508: Yes), the resource managing section 1a3 permits writing into the file, allows the intermediate code executing section 1a6 to write data into the file (S509), changes the size of the corresponding file within the use resource group 1a2 (S510), and finishes the processing as indicated in the present flowchart.

If the request from the intermediate code executing section 1a6 is not one of writing into the file (S507: No), the resource managing section 1a3 deletes the file (S511), deletes the corresponding file information from the use resource group 1a2 (S512) and finishes the processing as indicated in the present flowchart.

Figure 14:
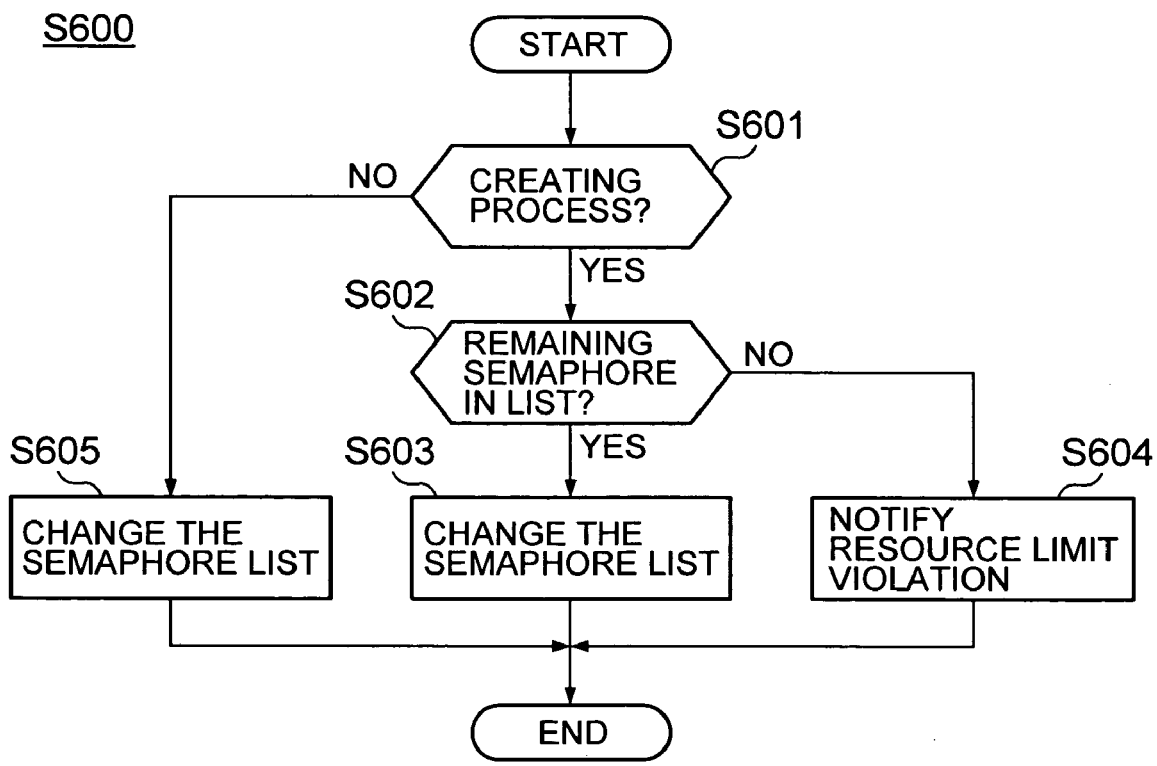
FIG. 14 is a flowchart showing an example of a semaphore creating/deleting process.

FIG. 14 is a flowchart showing an example of the semaphore creating/deleting process (S600). Firstly, the resource managing section 1a3 determines whether or not the processing is a semaphore creation (S601), and if it is the semaphore creation, the resource managing section refers to the use resource group 1a2, and determines whether or not there is an unused semaphore (S602). If there is an unused semaphore (S602: Yes), the resource managing section 1a3 notifies the intermediate code executing section 1a6 of permission for using the semaphore, and changes the state of the semaphore within the use resource group 1a2 to "in use" (S603), and finishes the processing as indicated in the present flowchart.

If there is not any unused semaphore (S602: No), the resource managing section 1a3 notifies the intermediate code executing section 1a6 of an error indicating that a semaphore cannot be secured (S604) and finishes the processing as indicated in the present flowchart. In the case where the processing is not a semaphore creating process (S601: No), the resource managing section 1a3 changes the state of the corresponding semaphore within the use resource group 1a2 to "standby" (S605), and finishes the processing as indicated in the present flowchart.

It is to be noted that in the present example, semaphores whose number of counts is the same as the limit value are secured in advance when the virtual machine 1a1 is started. In the present flowchart, if creation of a semaphore is necessary, the OS 143 is not requested to newly secure a semaphore, but an unused semaphore is allocated from the semaphores already secured at the time of starting up. In addition, if creation of a semaphore is not necessary, the OS 143 is not requested to release the semaphore, but the state of the semaphore is changed to "standby".

As shown in FIG. 12 to FIG. 14, a resource creating and deleting process can be implemented in various ways. However, in any of the ways, it is possible to be aware of the resource volume used for the creating or deletion, and at the point of time when a violation of limit value occurs, the volume can be detected immediately.

Figure 15:
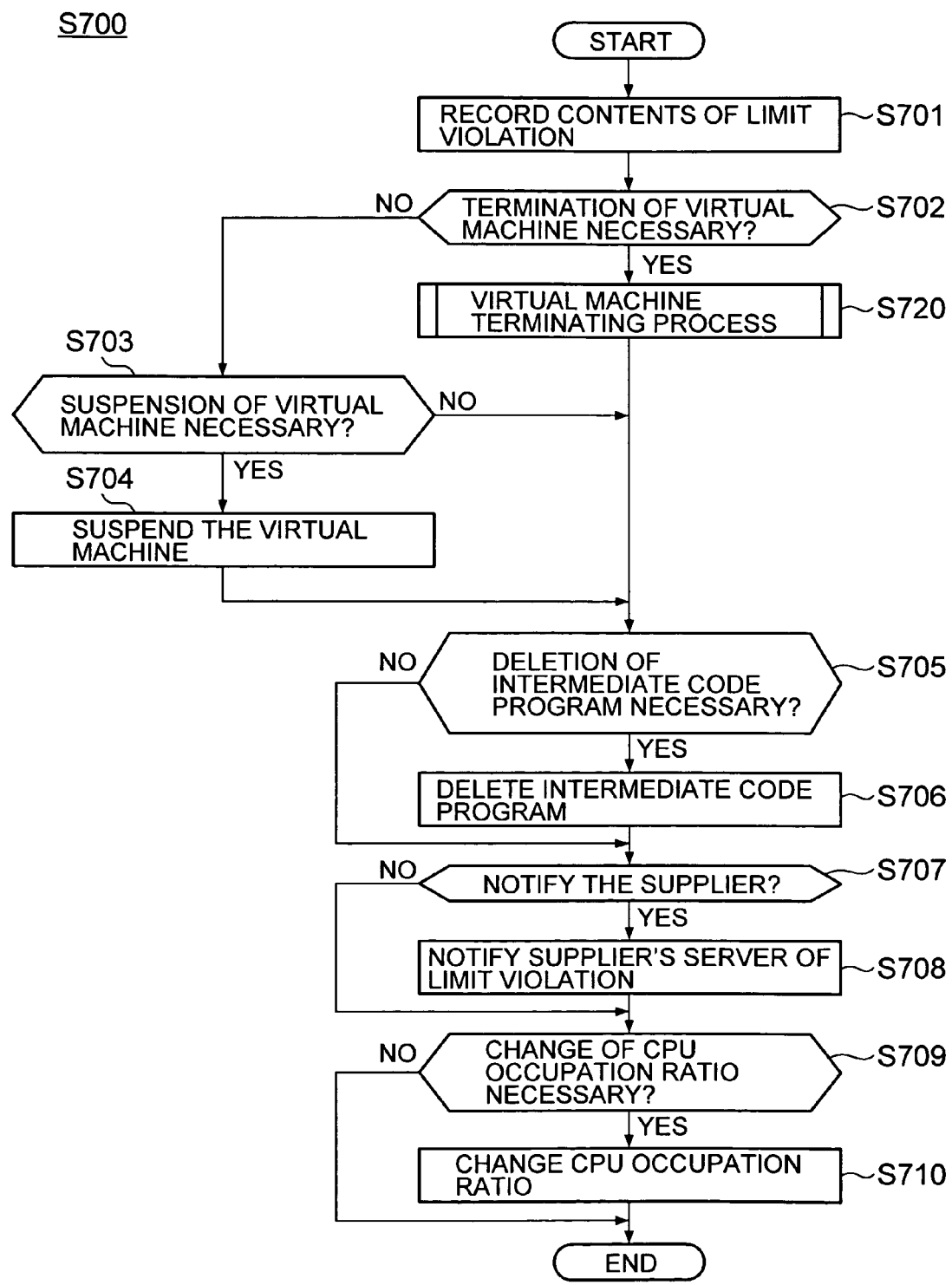
FIG. 15 is a flowchart showing an example of a limit violation process.

FIG. 15 is a flowchart showing an example of the process for limit violation (S700). At first, the resource managing section 1a3 records the contents of a limit violation that has occurred in steps 400, 500, 600, 303, or 304, as shown in FIG. 11, into the resource violation history 155 (S701). With reference to the resource violation history 155 and the process setting when violation occurs 156, the resource managing section 1a3 determines whether or not terminating of the virtual machine is necessary depending on the violation thus occurred (S702).

When it is determined that terminating of the virtual machine is not necessary (S702; No), the resource managing section 1a3 refers to the resource violation history 155 and the process setting when violation occurs 156. If suspension of the virtual machine is necessary according to the violation that occurred (S703: Yes), the resource managing section 1a3 instructs the virtual machine switching control section 137 to suspend the corresponding virtual machine (S704), and the processing as indicated in step 705 is performed. If suspension of the virtual machine is not necessary (S703: No), the processing as shown in step 705 is performed.

Referring to the resource violation history 155 and the process setting when violation occurs 156, if it is determined that termination of the virtual machine is necessary according to the violation that occurred (S702: Yes), the resource managing section 1a3 instructs the virtual machine switching control section 137 to terminate the corresponding virtual machine (S720).

Next, referring to the resource violation history 155 and the process setting when violation occurs 156, it is determined whether or not it is necessary to delete the intermediate code program executed by the virtual machine according to the violation thus occurred (S705). If it is not necessary to delete the corresponding intermediate code program (S705: No), processing as indicated in step 707 is performed. If it is necessary to delete the corresponding intermediate code program (S705: Yes), the resource managing section 1a3 requests the intermediate code program managing section 136 to delete the corresponding intermediate code program, thereby allowing the intermediate code program managing section 136 to delete the corresponding intermediate code program (S706). In step 706, the intermediate code program managing section 136 deletes the intermediate code program as a deletion target from the other tasks 142.

Figure 16:
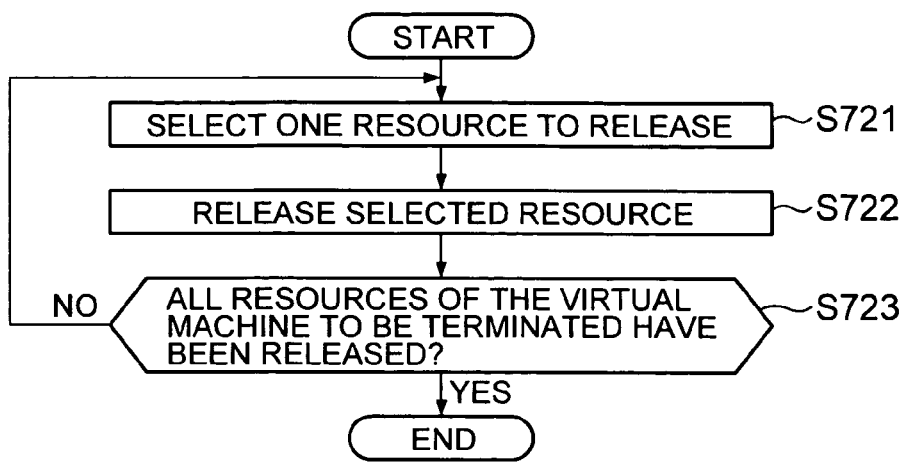
FIG. 16 is a flowchart showing an example of a virtual machine terminating process.

FIG. 16 is a flowchart showing an example of the virtual machine terminating process (S720). Firstly, the resource managing section 1a3 refers to the use resource group 1a2, selects one of the computer resources secured by the intermediate code program which is to be terminated (S721), and requests the OS 143 to release the selected computer resource (S722). Then, the resource managing section 1a3 determines whether or not all the computer resources have been selected, which are secured by the intermediate code program to be terminated (S723). If there exists a computer resource that has not been selected (S723: No), processing as indicated in step 721 is performed again. If all the computer resources secured by the intermediate code program to be terminated have been selected (S723: Yes), processing as indicated in the present flowchart is finished.

By referring to the use resource group 1a2, the resource managing section 1a3 is capable of releasing the computer resources reliably, which are secured by the intermediate code program to be terminated.

Figure 17:
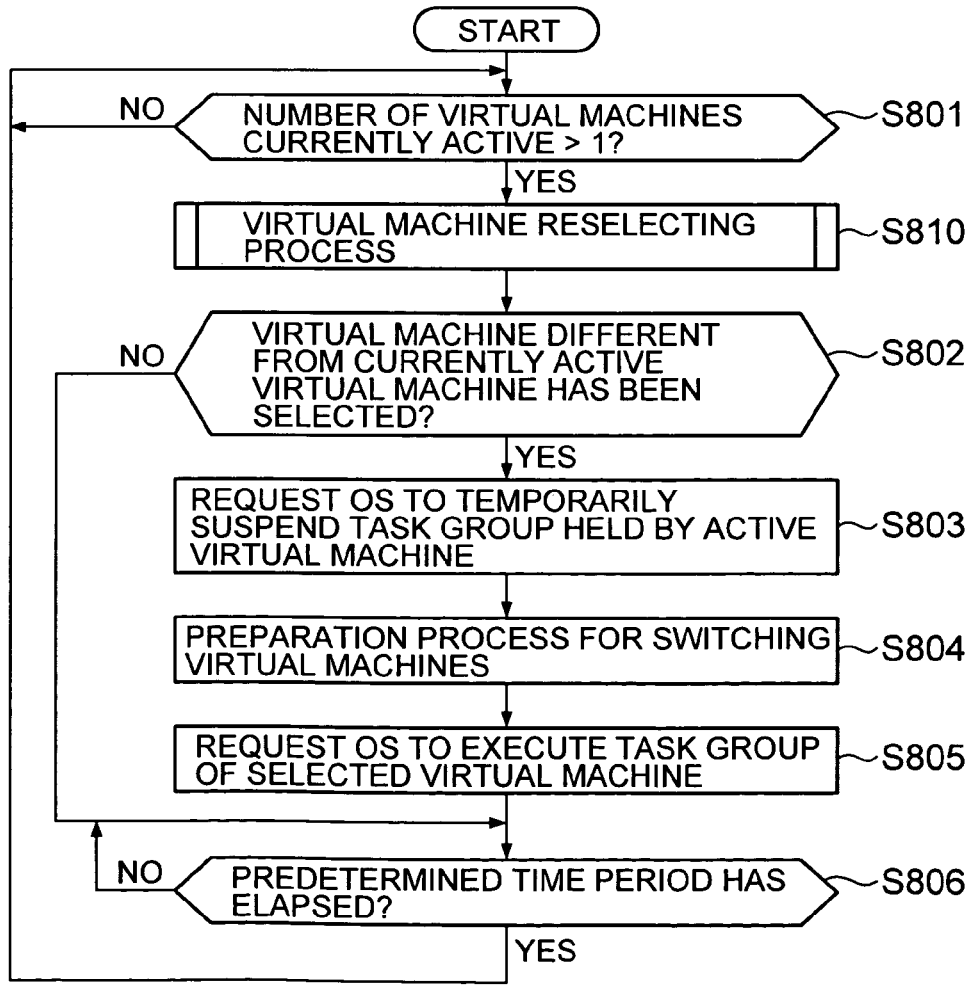
FIG. 17 is a flowchart showing an example of operation of a virtual machine switching control section 137.

FIG. 17 is a flowchart showing an example of the operations of the virtual machine switching control section 137. The virtual machine switching control section 137 starts processing as indicated in the present flowchart at a predetermined time such as when power is applied to the in-vehicle terminal 101. Firstly, the virtual machine switching control section 137 determines whether or not the number of the virtual machine units currently active is at least two (S801). If the number of virtual machine units currently active is one or less (S801: No), step 801 is repeated until the number of virtual machine units becomes two or more.

If the number of the virtual machine units currently active is two or more (S801: Yes), the virtual machine switching control section 137 executes a virtual machine reselecting process which selects any one machine out of multiple virtual machines (S810) Then, the virtual machine switching control section 137 determines whether or not the virtual machine thus selected is different from the virtual machine currently active (S802). If the selected virtual machine is identical to the virtual machine currently active (S802: No), the processing as indicated in step 806 is performed.

If the virtual machine being selected is different from the virtual machine currently active (S802: Yes), the virtual machine switching control section 137 requests the OS 143 to temporarily suspend the tasks which correspond to whole tasks allocated to the virtual machine currently active and managed by the OS 143 (S803). Then, the virtual machine switching control section 137 performs preparation for switching the virtual machines (S804). In step 804, the virtual machine switching control section 137 performs processing such as rewriting the virtual machine ID 1321 associated with the resource type used by the selected virtual machine in the resource occupation state list 132, and saving an execution environment such as global variable area that has been used in the common memory 141 by the task associated with the virtual machine having been active, into the common memory saving area 1a7 or the common memory saving area 1b7 of the virtual machine having been active.

Next, the virtual machine switching control section 137 requests the OS 143 to restart executing the task associated with the virtual machine selected in step 2602 (S805). Then, the virtual machine switching control section 137 waits for a predetermined period of time such as 100 ms (S806), and then executes again the processing as indicated in step 801.

Figure 18:
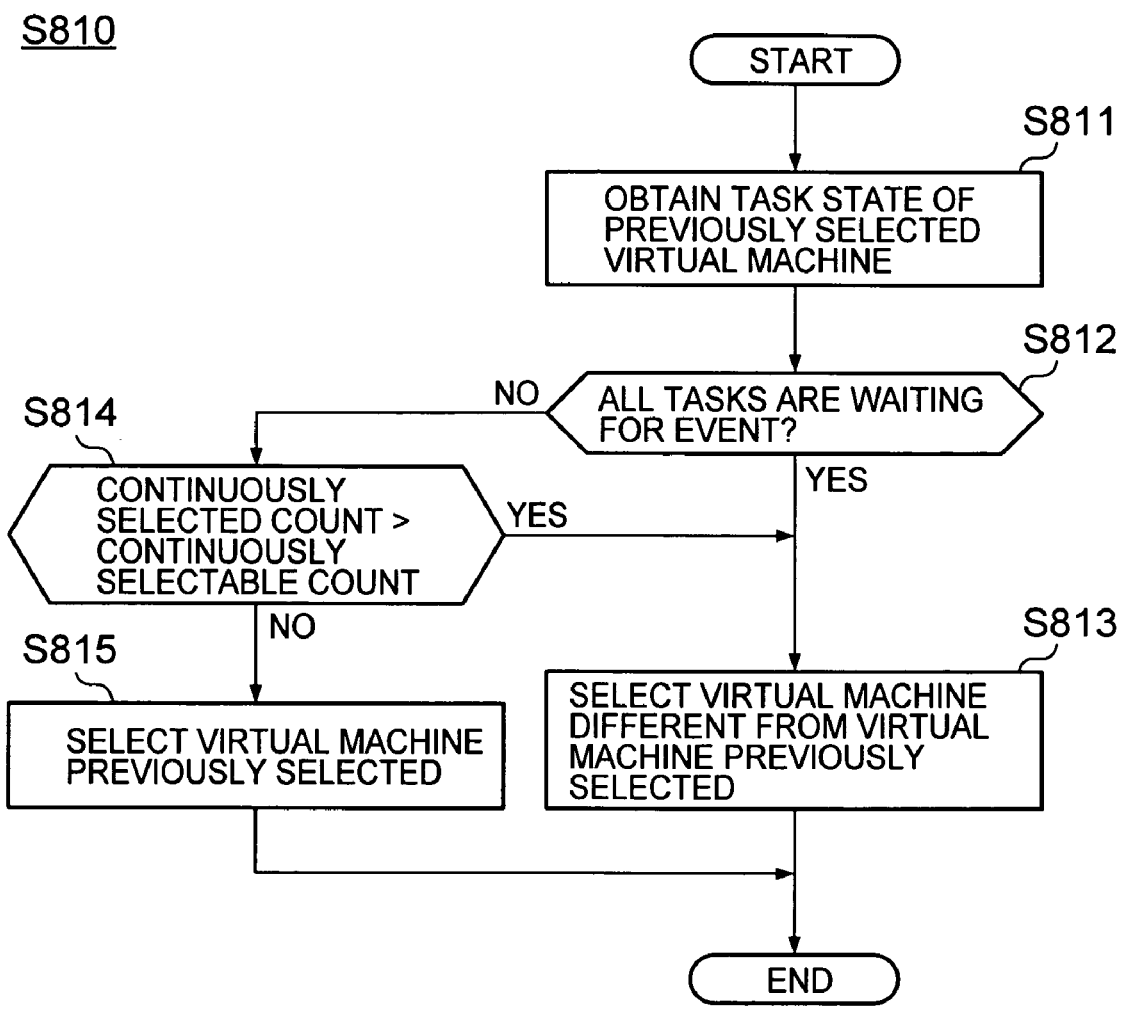
FIG. 18 is a flowchart showing an example of a virtual machine reselecting process.

FIG. 18 is a flowchart showing an example of the virtual machine reselecting process (S810). Firstly, the virtual machine switching control section 137 inquires the OS 143 to obtain the state of the currently active task, that is, the task previously selected (S811). Then, the virtual machine switching control section 137 determines whether or not all the tasks allocated to the previously selected virtual machine are in the state of "standby", waiting for inputting or waiting for an event such as a timer (S812).

If any of the tasks is not in standby state (S812: No), the virtual machine switching control section 137 determines whether or not the continuously selected count of the virtual machine previously selected is over the continuously selectable count, which is allocated to the virtual machine (S814). In step 814, the virtual machine switching section 137 holds the continuously selected count of the selected virtual machine. In addition, the virtual machine switching control section 137 calculates the continuously selectable count of each of the virtual machines based on the limit value of the CPU appropriation rate within the resource limit data 154 as shown in FIG. 5. In the present example, since the limit value of the CPU appropriation rate associated with the virtual machine 1a1 is 70% and the limit value of the CPU occupation ratio associated with the virtual machine 1b1 is 30%, the virtual machine switching control section 137 calculates values of the continuously selectable count in proportion to these ratios. For example, the virtual machine switching control section 137 calculates the continuously selectable count of the virtual machine 1a1 as seven times, and the continuously selectable count of the virtual machine 1b1 as three times.

If the continuously selected count of the previously selected virtual machine is equal to or less than the continuously selectable count allocated to the virtual machine (S814: No), the virtual machine switching control section 137 selects the previously selected virtual machine for this time again, and increments the continuously selected count of the selected virtual machine (S815), and then the processing as indicated in the present flowchart is finished. If the continuously selected count of the previously selected virtual machine is over the continuously selectable count allocated to the virtual machine (S814: Yes), the virtual machine switching control section 137 selects a virtual machine different from the previously selected virtual machine, and sets the continuously selected count of the selected virtual machine to 1 (one) (S813), and the processing as indicated in the present flowchart is finished.

As thus described, by switching the virtual machines so that they are executed according to a predetermined allocation, it is possible to execute multiple virtual machines in parallel, while assigning CPU processing time with an allocation nearly equal to the CPU appropriation rate specified when it was designed. This switching process employs a task suspending and resuming function, and a task event standby inquiring function, which are held by the OS 143. Therefore, if the OS is a multitask OS providing those functions above, it is possible to control the CPU appropriation rate of the virtual machine even without a CPU appropriation rate control function, allowing multiple virtual machines to operate appropriately.

In addition, the virtual machine switching process performed by the aforementioned virtual machine switching control section 137 is implemented by requesting the OS to manipulate tasks, and this switching process does not directly control the scheduler held by the OS 143. Therefore, the virtual machine does not affect task switching of the other tasks 142 that perform native processing other than the tasks allocated to the virtual machine 1*a*1 or virtual machine 1*b*1, and the virtual machine managing task 131. Accordingly, the virtual machine switching process can be implemented within the range of functions held by the OS 143, thereby achieving a stable operation of the system.

Preferred embodiments of the present invention have been explained so far.

As is apparent from the description above, according to the in-vehicle terminal 101 of the present invention, it is possible to reliably control the computer resources secured by the virtual machine 1*a*1 or the virtual machine 1*b*1 within the limit value that is allocated to the corresponding virtual machine. In addition, according to the in-vehicle terminal 101 of the present invention, multiple virtual machines can be executed appropriately.

It is to be noted here that the present invention is not limited to the above embodiments, but various variations are available within the scope of the invention.

For instance, in the present embodiment, explanations have been made taking two units of virtual machines as an example, but the present invention is not limited to this example. The present invention is applicable to the in-vehicle terminal 101 that executes one unit of virtual machine. In the case above, the configuration of the in-vehicle terminal 101 according to the alternative example corresponds to that of the in-vehicle terminal 101 as shown in FIG. 1, from which following functions are excluded; i.e., the functions which perform processing on the premise that multiple virtual machines exist (common memory saving area 1*a*7, common memory saving area 1*b*7, resource occupation state list 132, virtual machine switching control section 137, safety tested intermediate code list 149, and common memory 141).

It is to be noted that the present invention is suitable for built-in type equipment, which is relatively rich in computer resources and parallel execution of applications is required, such as an in-vehicle terminal mounted on an automobile and the like. Other than the in-vehicle terminal, the present invention is particularly effective in applying the intermediate code technique to AV equipment, such as a TV set and hard disk recorder, or to a portable terminal such as a mobile phone and PDA.

Description of Reference Numerals

10 . . . in-vehicle communication system, 101 . . . in-vehicle terminal, 102 . . . primary storage unit, 103 . . . secondary storage unit, 104 . . . CPU, 105 . . . display unit, 106 . . . sound output unit, 107 . . . interior communications unit, 108 . . . remote control communication unit, 109 . . . exterior communication unit, 111 . . . air-conditioning controller, 112 . . . driving state monitor, 113 . . . brake state monitor, 114 . . . remote controller, 115 . . . portable communication terminal, 116 . . . intermediate code program management server, 121 . . . interior network, 122 . . . exterior network, 1*a*1 . . . virtual machine, 1*a*2 . . . use resource group, 1*a*3 . . . resource managing section, 1*a*4 . . . intermediate code program loading section, 1*a*5 . . . execution intermediate code program group, 1*a*6 . . . intermediate code executing section, 1*a*7 . . . common memory saving area, 1*b*1 . . . virtual machine, 1*b*2 . . . use resource group, 1*b*3 . . . resource managing section, 1*b*4 . . . intermediate code program loading section, 1*b*5 . . . execution intermediate code program group, 1*b*6 . . . intermediate code executing section, 1*b*7 . . . common memory saving area, 131 . . . virtual machine managing task, 132 . . . resource occupation state list, 1320, 1541, 1561 . . . resource type, 1321, 1540, 1551, 1560 . . . virtual machine ID, 133 . . . screen managing section, 134 . . . sound output managing section, 135 . . . event managing section, 136 . . . intermediate code program managing section, 137 . . . virtual machine switching control section, 140 . . . safety tested intermediate code list, 141 . . . common memory, 142 . . . other tasks, 143 . . . OS, 151 . . . basic program group, 152 . . . intermediate code program group, 153 . . . data file group, 154 . . . resource limit data, 1542 . . . limit value, 155 . . . resource violation history, 1550 . . . violation date and time, 1552 . . . intermediate code program name, 1553 . . . violated limit data, 1554 . . . violated volume, 156 . . . process setting when violation occurs, 1562 . . . violation count, 1563 . . . process when violation occurs, 201 . . . task information, 202 . . . file information, 203 . . . semaphore information, 204 . . . dynamic memory area information.

What is claimed is:

1. An information terminal comprising, a hardware processor;

a plurality of virtual machines which execute, on an OS (Operating System), one or more intermediate code programs that are programs represented by an intermediate code;

a resource limit value storing unit which stores a limit value of each computer resource which is usable by a virtual machine of the plurality of virtual machines;

a process-when-violation-occurs-storing-unit which stores, for combinations of said virtual machine, computer resource and violation count, a process which is to be used to handle a case when a number of times that a virtual machine computer resource request exceeds the limit value; and a resource managing unit in which, when a request for securing a resource is received from said virtual machine, the limit value stored in said resource limit value storing unit and assigned to said virtual machine which sends the request for securing a resource, is referred to, and if a number of times that said virtual machine has made a computer resource request for the computer resource that is used for said virtual machine by securing the computer resource in response to the request, is lower than said limit value, said OS is requested to secure the computer resource in response to the request, if the number of times that said virtual machine has made a computer resource request for the computer resource that is used for said virtual machine by securing the computer resource in response to the request, is equal to or higher than said limit value, said OS is not requested to secure the computer resource in response to the request, and a number of violation occurrences that said virtual machine has made a computer resource request that is equal to or higher than a limit value, is incremented by 1, wherein:

said resource managing unit is so configured that, if said number of violation occurrences that said virtual machine has made a computer resource request equal to or higher than a subject violation count stored in said process-when-violation-occurs-storing-unit, associated with a combination of said virtual machine and computer resource, the process to handle a case stored in said process-when-violation-occurs-storing-unit, associated with a subject combination of said virtual machine, computer resource, and said subject violation count, is executed.

2. A computer resource managing method for an information terminal, wherein said method:

refers to a resource limit value storing unit which stores a limit value of each computer resource usable by a virtual machine of a plurality of virtual machines, when a request for securing the resource is received from the virtual machine that executes, on an OS (Operating System), one or more intermediate code programs being a program represented by an intermediate code;

if a number of times that said virtual machine has made a computer resource request for the computer resource that is used for said virtual machine by securing the computer resource in response to the request, is lower than said limit value, requests said OS to secure the computer resource in response to the request;

if the number of times that said virtual machine has made a computer resource request for the computer resource that is used for said virtual machine by securing the computer resource in response to the request, is equal to or higher than said limit value, does not request said OS to secure the computer resource in response to the request, and a number of violation occurrences that said virtual machine has made a computer resource request that exceeds said limit value, is incremented by 1;

if the number of violation occurrences that said virtual machine has made a computer resource request is equal to or higher than a subject violation count stored in a process-when-violation-occurs-storing-unit, associated with a combination of said virtual machine and computer resources, a process stored in said process-when-violation-occurs-storing-unit, to handle a case stored in said process-when-violation-occurs-storing-unit, associated with a subject combination of said virtual machine, computer resource, and said subject violation count, is executed.

3. An information terminal comprising, a hardware processor;

a plurality of virtual machines, with each virtual machine configured to execute, on an OS (Operating System), plural intermediate code programs that are each a program represented by an intermediate code;

a resource limit value storing unit which stores a limit value of each computer resource which is usable by a virtual machine of the plurality of virtual machines;

a process-when-violation-occurs-storing-unit which stores for combinations of said virtual machine, computer resource and violation count, a process which is to be used to handle a case when a number of times a virtual machine computer resource request exceeds the limit value; and a resource managing unit in which, when a request for securing a resource is received from said virtual machine, the limit value stored in said resource limit value storing unit and assigned to said virtual machine which sends the request for securing a resource, is referred to, and if a number of times that said virtual machine has made a computer resource request for the computer resource that is used for said virtual machine by securing the computer resource in response to the request, is lower than said limit value, said OS is requested to secure the computer resource in response to the request, and if the number of times that said virtual machine has made a computer resource request for the computer resource that is used for said virtual machine by securing the computer resource in response to the request, is equal to or higher than said limit value, said OS is not requested to secure the computer resource in response to the request, and a number of violation occurrences that said virtual machine has made a computer resource request that is equal to or higher than a limit value, is incremented by 1, wherein:

said resource managing unit is so configured that, if said number of violation occurrences that said virtual machine has made a computer resource request is equal to or higher than a subject violation count stored in said process-when-violation-occurs-storing-unit, associated with a combination of said virtual machine and computer resource, the process to handle a case stored in said process-when-violation-occurs-storing-unit, associated with a subject combination of said virtual machine, computer resource, and violation count, is executed.

4. A computer resource managing method for an information terminal, wherein said method:

refers to a resource limit value storing unit which stores a limit value of each computer resource usable by a virtual machine of a plurality of virtual machines, when a request for securing the resource is received from the virtual machine, where each virtual machine is configured to sequentially execute, on an OS (Operating System), plural intermediate code programs that are each a program represented by an intermediate code;

if a number of times that said virtual machine has made a computer resource request for the computer resource that is used for said virtual machine by securing the computer resource in response to the request, is lower than said limit value, requests said OS to secure the computer resource in response to the request if the number of times that said virtual machine has made a computer resource request for the computer resource that is used for said virtual machine by securing the computer resource in response to the request, is equal to or higher than said limit value, does not request said OS to secure the computer resource in response to the request, and a number of violation occurrences that said virtual machine has made a computer resource request that exceeds said limit value is incremented by 1, if the number of violation occurrences that said virtual machine has made a computer resource request is equal to or higher than a subject violation count stored in a process-when-violation-occurs-storing-unit, associated with a combination of said virtual machine and computer resource, the process to handle a case stored in said process-when-violation-occurs-storing-unit, associated with a subject combination of said virtual machine, computer resource, and said subject violation count, is executed.

* * * * *